(12) United States Patent
Sasaki

(10) Patent No.: US 6,961,085 B2
(45) Date of Patent: Nov. 1, 2005

(54) DIGITAL IMAGE PROCESSING AND DATA COMPRESSION CIRCUIT

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 562 days.

(21) Appl. No.: 09/964,458

(22) Filed: Sep. 28, 2001

(65) Prior Publication Data

US 2002/0039143 A1 Apr. 4, 2002

(30) Foreign Application Priority Data

Oct. 2, 2000 (JP) ............................. 2000-302355

(51) Int. Cl.[7] .......................................... H04N 5/228
(52) U.S. Cl. ............................. 348/222.1; 348/231.99; 348/246
(58) Field of Search .................. 348/231.99, 220.1, 348/246–247, 14.12, 231.1, 231.2, 231.6, 348/243, 322, 222.1, 410; 386/109, 112, 386/117; 382/239

(56) References Cited

U.S. PATENT DOCUMENTS

| | | | | |
|---|---|---|---|---|
| 4,455,575 A | * | 6/1984 | Murakoshi | 348/322 |
| 4,661,862 A | * | 4/1987 | Thompson | 386/112 |
| 5,844,600 A | * | 12/1998 | Kerr | 348/14.12 |
| 6,212,331 B1 | * | 4/2001 | Fukuoka et al. | 386/117 |
| 6,351,568 B1 | * | 2/2002 | Andrew | 382/239 |
| 2001/0012067 A1 | * | 8/2001 | Spitzer et al. | 348/243 |

OTHER PUBLICATIONS

U.S. Appl. No. 09/459,574, filed Dec. 13, 1999, pending.
U.S. Appl. No. 09/504,082, filed Feb. 15, 2000, pending.
U.S. Appl. No. 09/985,373, filed Nov. 2, 2001, pending.
U.S. Appl. No. 10/694,914, filed Oct. 29, 2003, Sasaki.
U.S. Appl. No. 10/694,913, filed Oct. 29, 2003, Sasaki.
U.S. Appl. No. 10/694,909, filed Oct. 29, 2003, Sasaki.

* cited by examiner

Primary Examiner—David L. Ometz
Assistant Examiner—Brian Jelinek
(74) Attorney, Agent, or Firm—Oblon, Spivak, McClelland, Maier & Neustadt, P.C.

(57) ABSTRACT

CCD data is compressed by compression means and stored in a raw image data buffer (step 10). Then, the compressed data is expanded by expansion means, so that pixel data thereof is sequentially output to an RPU (step 11). The RPU executes real-time image processing on the pixel data, so that the processed data is stored in a processed data buffer in units of frames. Then, a CPU reads an image from the processed data buffer at a proper timing and performs software processing such as high-efficiency coding through a temporary storage data buffer, for storing and preserving the processed data in a storage medium (step 12). Thus provided is an image processing circuit capable of reducing the scale of buffer areas in a memory for remarkably reducing the cost for the memory as well as power consumption.

15 Claims, 14 Drawing Sheets

F I G . 1
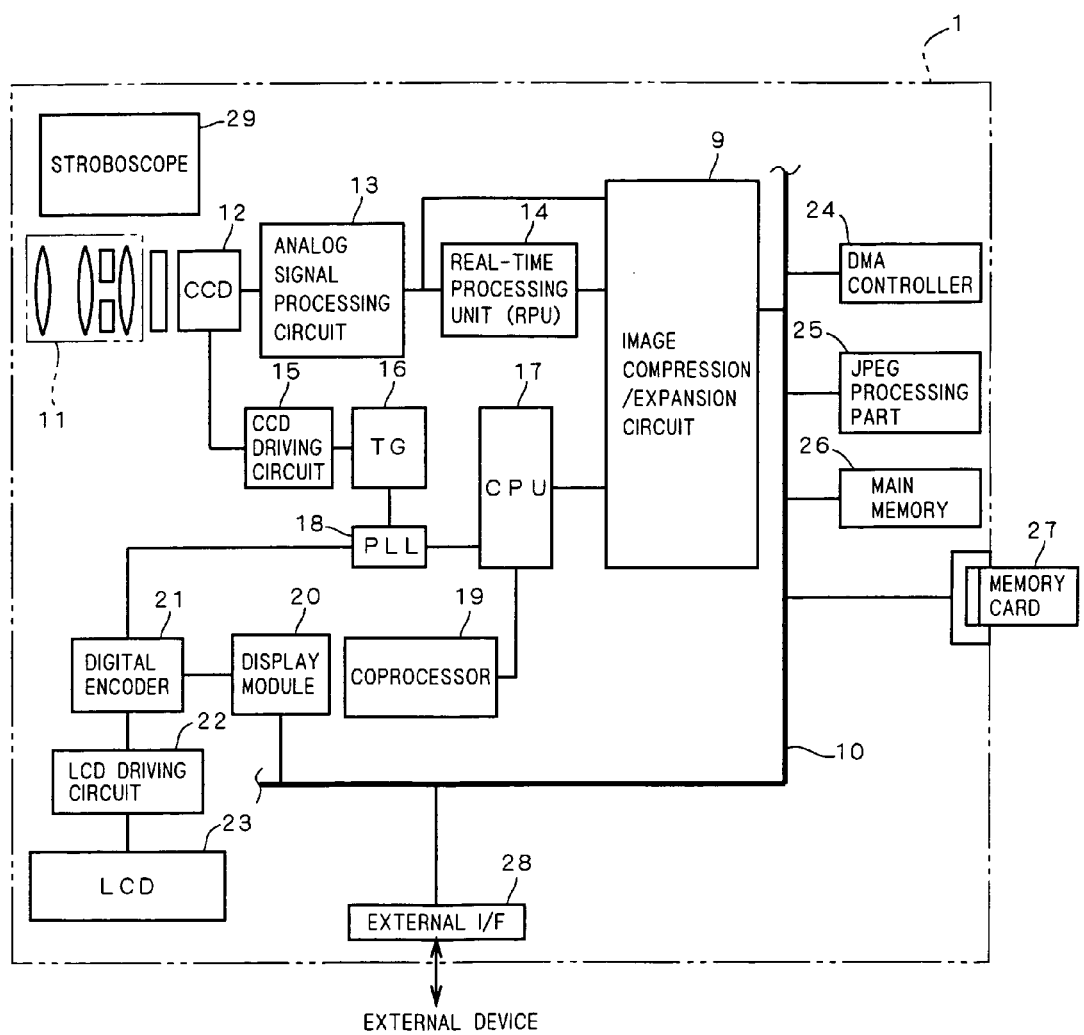

CALCULATE DIFFERENCE BETWEEN ADJACENT PIXELS

CALCULATE DIFFERENCE BETWEEN ALTERNATE PIXELS

CALCULATE DIFFERENCE BETWEEN VERTICAL PAIRS OF PIXELS
ON ADJACENT PAIRS OF LINES

CALCULATE DIFFERENCE BETWEEN VERTICAL PAIRS OF PIXELS
ON ALTERNATE PAIRS OF LINES

DIGITAL IMAGE PROCESSING AND DATA COMPRESSION CIRCUIT

BACKGROUND OF THE INVENTION

1. Field of the Invention

The present invention relates to an image processing circuit for image-processing image data picked up with an image pickup device such as a digital still camera.

2. Description of the Background Art

FIG. 13 schematically illustrates the structure of a general digital still camera 100. As shown in FIG. 13, an image signal picked up with an image pickup device 105 such as a loaded CCD or CMOS sensor is A/D converted to a digital image signal and thereafter captured by an image processing part 106, to be subjected to various image processing such as pixel interpolation, color space conversion and contour correction. The image data subjected to the image processing is displayed on a finder of a liquid crystal monitor 109 or the like, stored in a memory card 110 or output to an external device such as a personal computer through an interface 111. Referring to FIG. 13, numeral 101 denotes an optical lens, numeral 102 denotes a color correction filter, numeral 103 denotes an optical LPF (low-pass filter), numeral 104 denotes a color filter array, and numeral 107 denotes a driving part driving/controlling the image pickup device 105 etc.

As shown in FIG. 14, the image signal picked up with the image pickup device 105 is converted to a digital image signal (CCD data) and thereafter temporarily stored in a raw image data buffer 108a of a built-in memory 108 (step 100). Then, a real-time processing unit (hereinafter abbreviated as RPU) 120 formed by hardware provided in the aforementioned image processing part 106 reads the raw image data stored in the raw image data buffer 108a, executes the aforementioned image processing such as pixel interpolation, color space conversion and edge enhancement in real time, and outputs and stores the processed data to and in a processed data buffer 108b (step 101). Then, a CPU (central processing unit) 121 reads the processed data from the processed data buffer 108b at an instructed timing, compresses the processed data with a temporary storage buffer 108c by software processing in the JPEG (joint photographic experts group) system or the like, and stores the compressed data in a storage medium 122 such as the aforementioned memory card 110.

While the recent digital still camera is miniaturized and reduced in weight, the aforementioned built-in memory 108 is formed by a DRAM (dynamic random access memory) or an SDRAM (synchronous DRAM) and the buffer areas 108a to 108c used in the built-in memory 108 are increased in scale to disadvantageously increase the cost for a chip as well as power consumption.

Either an interlacing (interlace scanning) system reading two fields forming a frame, i.e., an even field consisting of only even lines and an odd field consisting of only odd lines, at absolutely different temporal timings or a progressive (sequential scanning) sequentially reading respective lines is employed for the aforementioned image pickup device 105. If the interlacing system is employed, three to five lines including a current line and a plurality of precedent and subsequent lines must be simultaneously processed when the RPU 120 executes pixel interpolation, for example, and hence it is necessary to capture the even field after storing the odd field in the raw image data buffer 108a for thereafter converting both fields to progressive data and outputting the same to the RPU 120. Therefore, reduction of the scale of the buffer areas 108a to 108c of the built-in memory 108 is limited.

SUMMARY OF THE INVENTION

According to a first aspect of the present invention, an image processing circuit processing raw image data picked up with an image pickup device comprises compression means compressing raw image data obtained by A/D converting the raw image data, a buffer part temporarily storing compressed data transferred from the compression means, expansion means reading the compressed data from the buffer part and expanding the same and an image processing part executing image processing on expanded data transferred from the expansion means.

The image processing circuit according to the first aspect temporarily compresses the raw image data and stores the same in the buffer part for performing image processing by reading the compressed data while expanding the same, whereby the scale of buffer areas of a memory can be reduced. Thus, it is possible to minimize the memory in response to the number of pixels of the image pickup device such as a CCD for optimizing the buffer areas thereof.

According to a second aspect of the present invention, the image pickup device is driven by an interlacing system reading an odd field consisting of only odd lines and an even field consisting of only even lines forming a frame at temporally different timings, the buffer part stores the compressed data of a first field formed by either the odd field or the even field, and the image processing part reads the first field stored in the buffer part in synchronization with entry of a second field formed by the remaining field and executes real-time image processing on the first and second fields.

According to the second aspect, the image processing part can execute real-time image processing on the first and second fields in the image processing part during a reading period for the second field, whereby the real-time image processing can be efficiently ended at the moment when reading of the second field is ended. Therefore, a picked-up image can be displayed on a finder substantially without a delay, for example.

According to a third aspect of the present invention, data transfer between the compression means and the buffer part, and data transfer between the expansion means and the buffer part are controlled by a direct memory access system.

According to the third aspect, data can be directly transferred between the compression means and the buffer part as well as between the expansion means and the buffer part without through a CPU, whereby the data can be processed at a high speed. Particularly when the image processing circuit according to the second aspect is employed and the image pickup device is driven by the interlacing system, the image processing part can efficiently perform real-time image processing in the reading period for the second field while transferring the first field stored in the buffer part to the expansion means by a DMA system at a high speed and expanding the same and the buffer part may not temporarily store the second field, whereby the scale of buffer areas on the memory can be reduced.

According to a fourth aspect of the present invention, the image processing circuit further comprises division means dividing the digital image data into a plurality of blocks and outputting the same to the compression means, and the compression means and the expansion means execute compression and expansion in units of the blocks.

When a defective pixel or the like is detected, only a block including this defective pixel can be corrected or replaced with another normal block according to the fourth aspect, whereby influence by the defective pixel can be efficiently suppressed to the minimum.

According to a fifth aspect of the present invention, the image processing circuit further comprises means detecting a block including previously specified defective pixel data among the expanded data expanded by the expansion means and outputting a block obtained by correcting the defective pixel data to the compression means.

According to the fifth aspect, previously specified defective pixel data is detected and corrected in units of blocks, whereby it is possible to efficiently correct a defective block for displaying and preserving a high-definition image at a high speed.

According to a sixth aspect of the present invention, the image processing circuit further comprises defect inspection/correction means performing a defect inspection before outputting the expanded data expanded by the expansion means to the image processing part for replacing a block having detected defective pixel data with a normal block and outputting the same to the compression means.

According to the sixth aspect, defective pixel data is detected in units of blocks for replacing a defective block with a normal block, whereby it is possible to efficiently correct the defective block for displaying and preserving a high-definition image at a high speed.

According to a seventh aspect of the present invention, the division means divides the digital image data into a plurality of blocks in units of lines.

According to the seventh aspect, it is possible to detect a defect in units of lines for efficiently correcting the defect and providing a high-definition object image.

According to an eighth aspect of the present invention, the image processing circuit further comprises difference calculation means calculating the difference between pixel values of the digital image data and outputting the difference to the compression means before compressing the digital image data in the compression means.

According to the eighth aspect, the image data can be efficiently coded and stored in a buffer area, whereby the memory can be minimized in response to the number of pixels of the image pickup device such as a CCD or the like and the buffer area thereof can be optimized.

According to a ninth aspect of the present invention, the difference calculation means calculates the difference between the values of pixels adjacent to each other along the time base.

According to a tenth aspect of the present invention, the difference calculation means calculates the difference between the values of alternate pixels along the time base.

According to an eleventh aspect of the present invention, the difference calculation means calculates the difference between the values of vertically adjacent two pixels of two lines of the digital image data.

According to a twelfth aspect of the present invention, the difference calculation means calculates the difference between the values of vertically adjacent two pixels of alternate lines of the digital image data.

According to the ninth to twelfth aspects, image data can be efficiently compression-coded.

According to a thirteenth aspect of the present invention, the difference calculation means according to either the eleventh or twelfth aspect is selected in response to the driving system for the image pickup device.

According to the thirteenth aspect, differential compression of the values of pixels of the same color component can be executed to be suitable to the arrangement of a color filter array of the image pickup device.

Accordingly, an object of the present invention is to provide an image processing circuit capable of reducing the scale of buffer areas in a memory for remarkably reducing the cost for the memory as well as power consumption.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 schematically illustrates an exemplary structure of a general digital still camera; and FIG. 14 is a block diagram showing an exemplary flow of conventional image signal processing.

DESCRIPTION OF THE PREFERRED EMBODIMENTS

Figure 1:
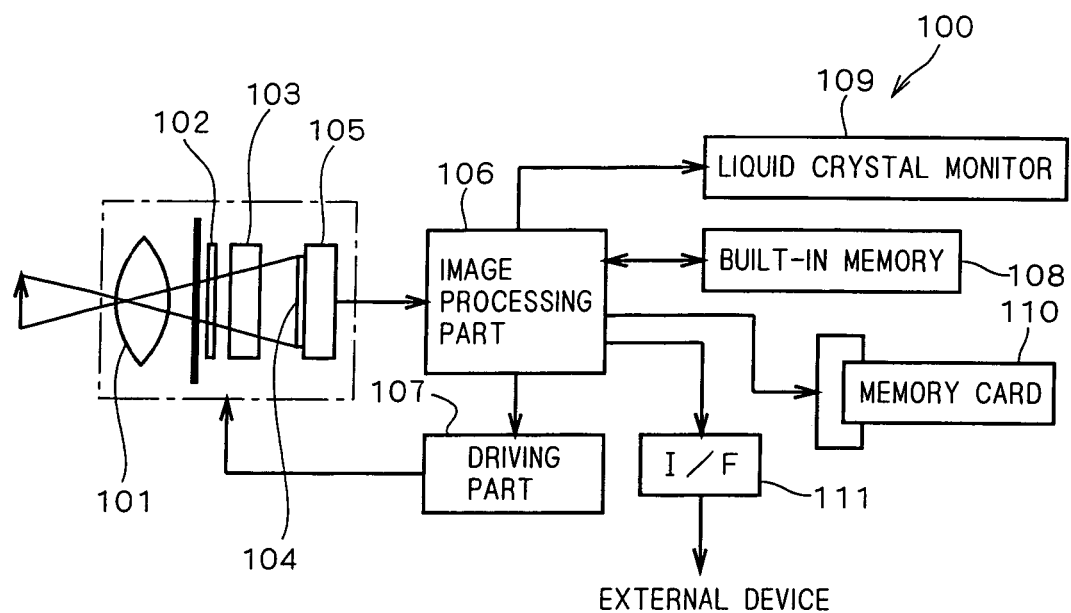
FIG. 1 is a schematic block diagram showing the overall structure of a digital still camera according to the present invention.
Figure 1:
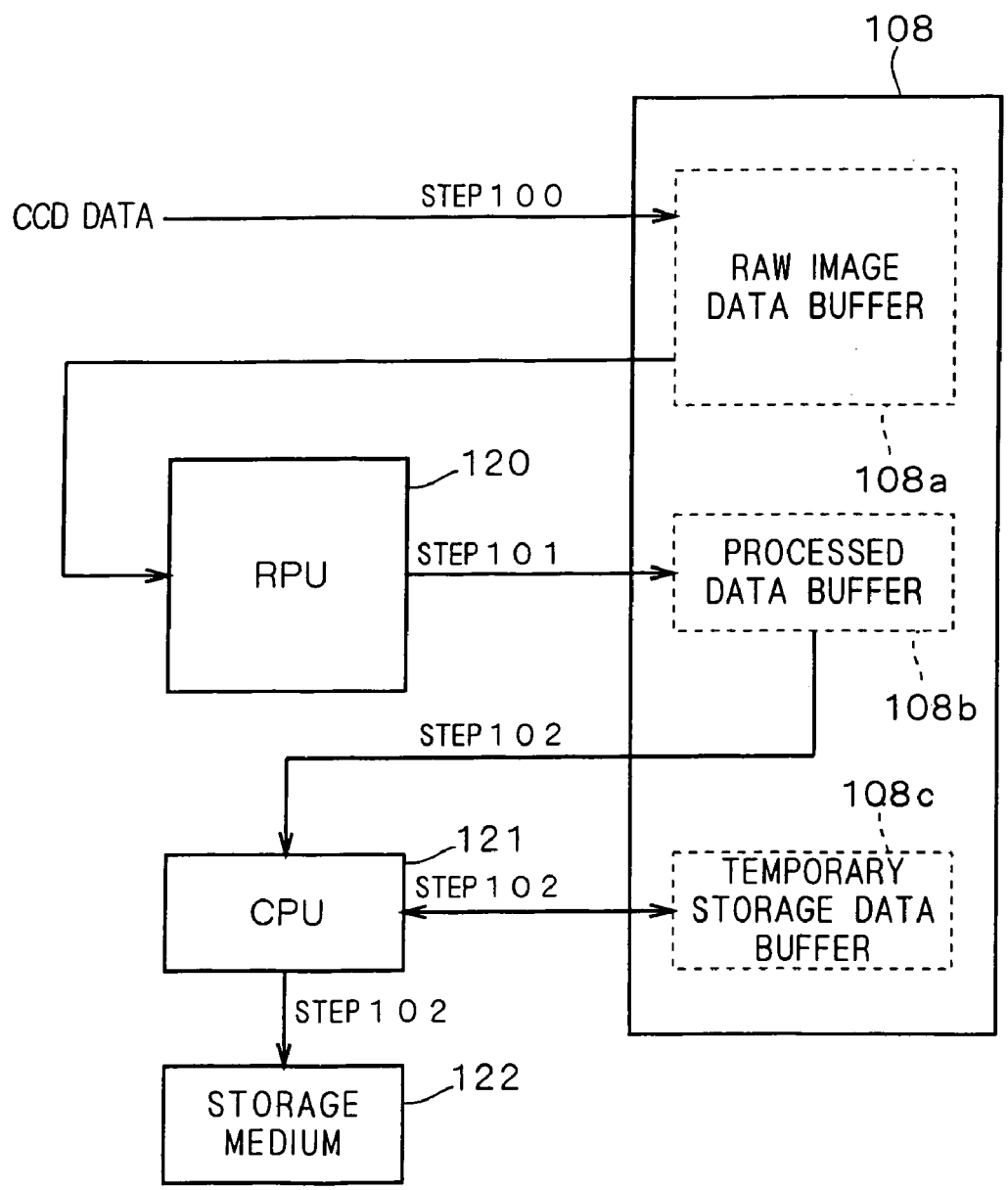

FIG. 1 is a schematic block diagram showing the overall structure of a digital still camera (image pickup device) 1 according to the present invention. In this digital still camera 1, a CCD (charge-coupled device) 12 picks up an image signal of an object through an optical mechanism 11 formed by an optical system and a diaphragm mechanism having an AF (auto-focus) function. At this time, a stroboscope 29 may be employed at need for applying light to the object. The image signal of the object as picked up is captured in an analog signal processing circuit 13 and A/D converted to a digital image signal.

This digital image signal is compressed in an image compression/expansion circuit 9 as described later in detail, and transferred to a main memory 26 to be stored in its buffer area. The compressed data is expanded in the image compression/expansion circuit 9, and thereafter subjected to prescribed image processing such as pixel interpolation, color space conversion, edge enhancement, filtering or culling in a real-time processing unit (hereinafter abbreviated as RPU) 14 in real time.

The image signal subjected to real-time image processing as described above can be displayed on an LCD 23 serving as a finder, subjected to image processing such as JPEG compression in a CPU 17 and thereafter stored in a memory card 27, or output to an external device such as a personal computer through an external interface (I/F) 28. The main memory 26 formed by a DRAM, an SDRAM or an RDRAM (Rambus DRAM) is provided with a buffer area temporarily storing data processed in the RPU 14, a buffer area temporarily utilized when the CPU 17 executes software processing and the like.

Referring to FIG. 1, numeral 15 denotes a CCD driving circuit driving the CCD 12, numeral 16 denotes a timing generator regulating operation timings of the RPU 14 and the CCD driving circuit 15, numeral 18 denotes a PLL oscillation circuit, numeral 19 denotes a coprocessor which is an auxiliary arithmetic unit for the CPU 17, numeral 20 denotes a display module, numeral 21 denotes a digital encoder and numeral 22 denotes an LCD driving circuit driving the LCD 23.

The respective elements, i.e., the image compression/expansion circuit 9, the main memory 26, the external interface 28, the memory card 27, a DMA (direct memory access) controller 24 and a JPEG processing part 25 are interconnected with each other through a main bus 10, so that data transfer between these elements can be directly executed through the main bus 10 under control of the DMA controller 24 without control of the CPU 17. Thus, a load on the CPU 17 is reduced while the main memory 26 can be efficiently utilized.

When displayed on the LCD (finder) 23, the object image (frame) continuously output from the CCD 12 is subjected to real-time image processing for slightly reducing the resolution or the like in the RPU 14, and thereafter sequentially displayed on the LCD 23 as a motion picture. When capturing (picking up) the object image displayed on the LCD 23, the operator may simply press a pickup button (not shown) provided on the digital still camera 1. When the pickup button is pressed, the CPU 17 of the digital still camera 1 performs the aforementioned JPEG compression on the object image data for storing the compressed data in a storage medium such as the memory card 27 or outputting the same to the external device through the external interface 28.

Digital image data output from the analog signal processing circuit 13 may be directly output to the RPU 14 to be subjected to the aforementioned real-time image processing, or may be temporarily stored in the main memory 26 through the image compression/expansion circuit 9 to be thereafter loaded in the RPU 14 and subjected to the aforementioned real-time image processing. When partial processing unexecutable in the RPU 14 formed by hardware is executed with software in the CPU 17, for example, the processing speed can be improved to several times to tens of times as compared with a case of executing all image processing on software, and power consumption can be reduced due to reduction of processing in the CPU 17.

Either an interlacing (interlace scanning) system reading an even field consisting of only even lines and an odd field consisting of only odd lines forming a frame at temporally different timings or a progressive (sequential scanning) system sequentially reading and driving respective lines is selectively employed for the CCD 12 generally comprising a charge storing part and a charge transfer part therein. While the CCD 12 is employed as an image pickup device, the present invention is not restricted to this but a CMOS sensor having no charge transfer part is also employable.

Figure 2:
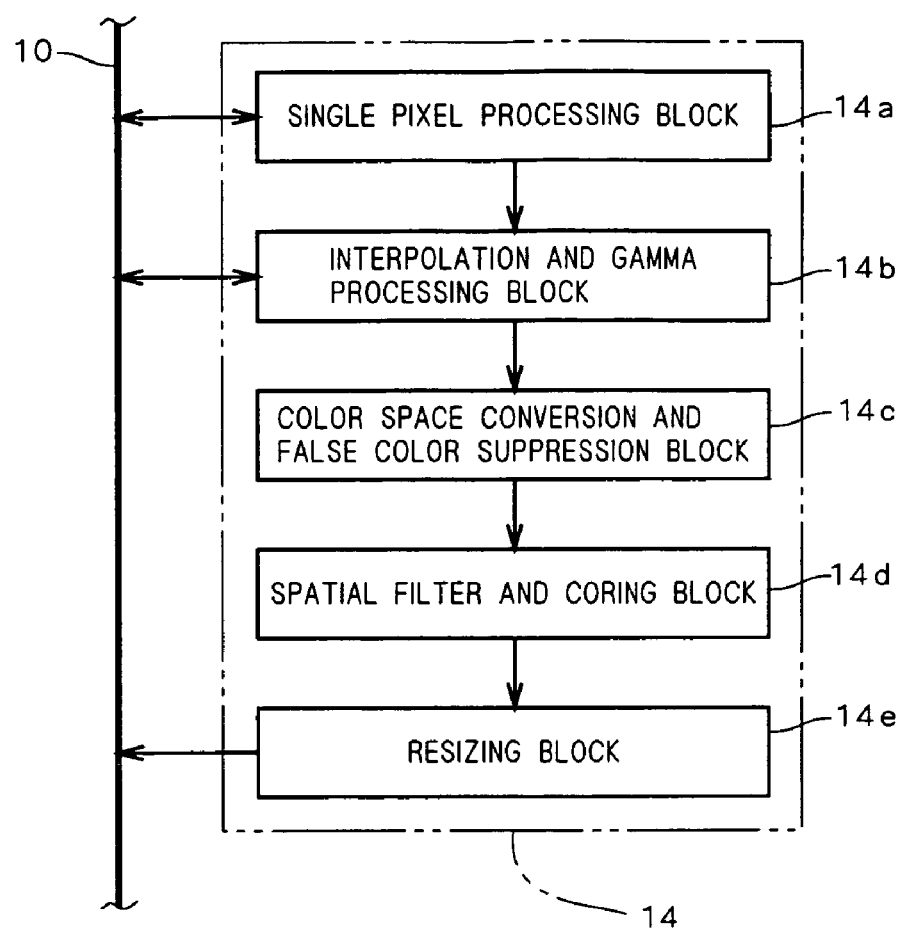
FIG. 2 is a block diagram showing an exemplary structure of a real-time processing unit (RPU) according to the present invention.

As shown in a block diagram of FIG. 2, the RPU 14 comprises a single pixel processing block 14a processing the digital image signal in units of pixels, an interpolation and gamma processing block 14b executing pixel interpolation described later in detail while correcting gamma characteristics (gamma correction), a color space conversion and false color suppression block 14c, a spatial filter and coring block 14d and a resizing block 14e outputting image data processed in the respective blocks 14a to 14d to the main bus 10.

Embodiment 1.

Figure 3:
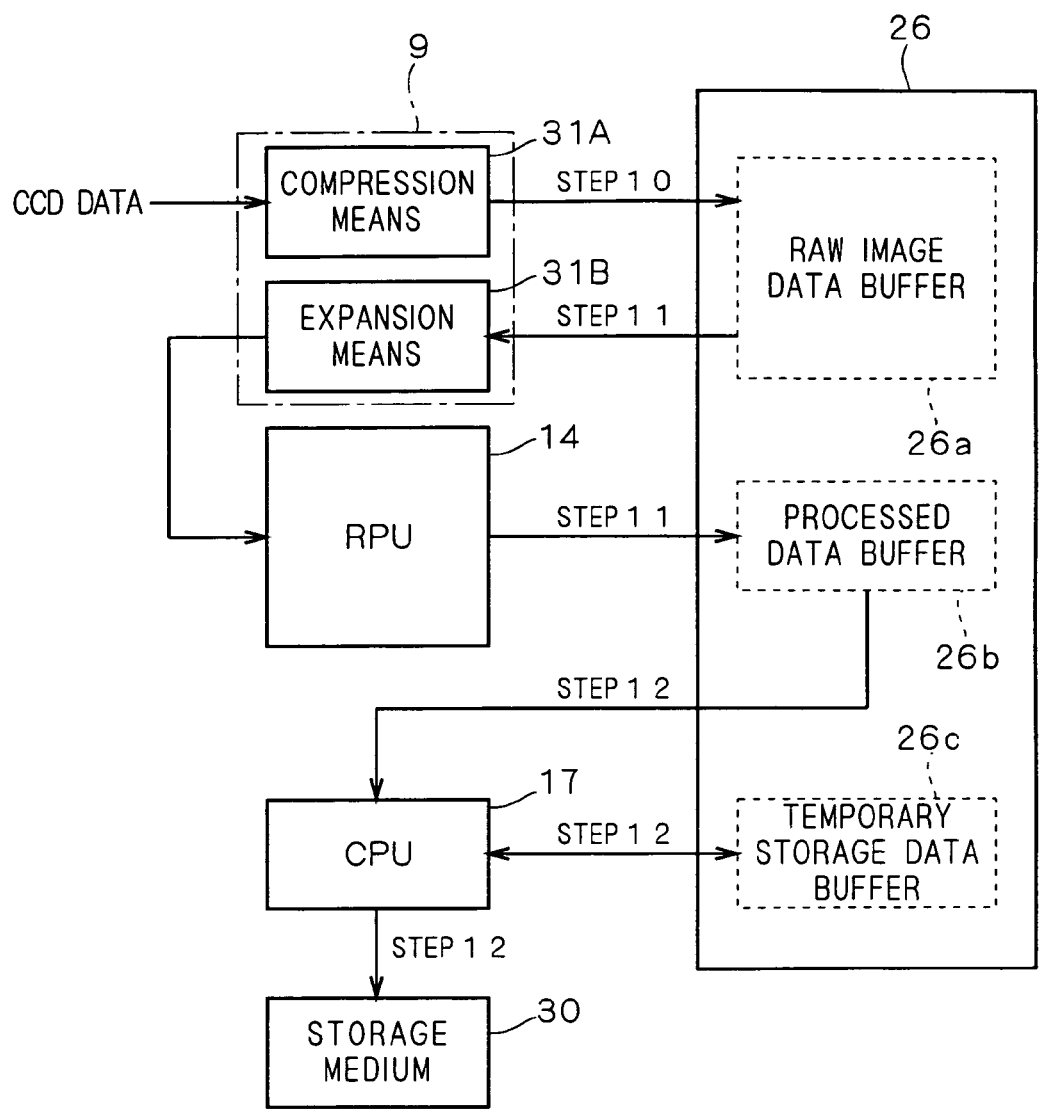
FIG. 3 is a schematic block diagram showing the flow of image signal processing by an image processing circuit according to an embodiment 1 of the present invention.

FIG. 3 is a schematic block diagram showing the flow of image signal processing by an image processing circuit according to an embodiment 1 of the present invention in the digital still camera (image pickup device) 1 having the aforementioned structure.

As shown in FIG. 3, CCD data (raw image data) picked up with the CCD 12 is A/D converted to a digital image signal in the aforementioned analog signal processing circuit 13, thereafter compressed by compression means 31A of the aforementioned image compression/expansion circuit 9 by binary arithmetic coding or entropy coding such as Huffman coding and transferred to a raw image data buffer 26a provided in the main memory 26 through the aforementioned main bus 10 to be temporarily stored therein (step 10). The CCD data may be output by either the interlacing system or the progressive system.

Then, the compressed data stored in the raw image data buffer 26a is expanded in expansion means 31B of the aforementioned image compression/expansion circuit 9 by entropy decoding or the like, so that pixel data thereof is sequentially output to the aforementioned RPU 14 (step 11). In parallel with the aforementioned expansion of the compressed data, the RPU 14 executes image processing on the input pixel data through the single pixel processing block 14a, the interpolation and gamma processing block 14b, the color space conversion and false color suppression block 14c, the spatial filter and coring block 14d and the resizing block 14e in real time so that the processed data output from the aforementioned resizing block 14e is transferred to and stored in a processed data buffer 26b provided in the main memory 26 in units of frames. While the compression means 31A and the expansion means 31B execute hardware processing for improving the compression/expansion speed in this embodiment, the CPU 17 may substitutionally execute the same type of software processing.

The single pixel processing block 14a performs either multiplication or addition every pixel of the digital image signal, thereby selectively performing either sequential averaging between a plurality of frames or shading correction in a single frame. Such a phenomenon that the brightness of the periphery is reduced as compared with the central position due to an optical action of a lens or the like when an image of an object or a landscape is picked up with the aforementioned CCD 12 is generally referred to as shading. In the aforementioned shading correction, gain control of the brightness in each pixel is executed for relaxing such shading.

The interpolation and gamma processing block 14b can capture the image data temporarily stored in the main memory 26 through the main bus 10 under control of the DMA controller 24. The image data can be directly input not only into the single pixel processing block 14a forming the initial stage of the RPU 14 but also into the next-stage interpolation and gamma processing block 14b through the main bus 10, whereby the interpolation and gamma processing block 14b can directly process the image data subjected to image processing in the CPU 17 without through the single pixel processing block 14a.

The color space conversion and false color suppression block 14c has a color space conversion function of converting image data expressed in the RGB-system three colors or the YMCG-system four colors to another color space coordinate system when an original signal is a color image signal and a false color suppression function of performing color suppression (chromatic suppression: false color prevention) on bright and dark parts of the image. A YUV coordinate system, a YIQ coordinate system or a $YC_bC_r$ coordinate system employed in the NTSC (national television system committee) system or the like may be employed for the converted coordinate system used in the color space conversion function. When the $YC_bC_r$ coordinate system is employed for color component conversion, for example, the RGB components thereof are converted to a coordinate system of $YC_bC_r$ components consisting of a brightness signal Y and two color difference signals $C_b$ and $C_r$. The correlation between the $YC_bC_r$ components is smaller than that between the RGB components, whereby the image size can be compressed.

In general, a dark part of an image is readily influenced by various noises, and hence color development is suppressed to the minimum for outputting an image of natural picture quality. On the other hand, a bright part of the image is readily modulated in response to the characteristics of a CCD picking up the image of the bright part or other various hardware components to readily lose white balance, and hence color development is suppressed to the minimum for outputting an image of natural picture quality. In consideration of these facts, color development in the bright and dark parts of the image is suppressed in the false color suppression function.

After executing the aforementioned image processing, the CPU 17 reads the image (frame) from the processed data buffer 26b when the operator of the digital still camera 1 presses the pickup button or upon control from the external device connected to the external interface 28 and performs software processing such as high-efficiency coding of JPEG compression employing DCT (discrete cosine transformation) or wavelet transformation, for example, for storing and preserving the processed data in a storage medium 30 such as the aforementioned memory card 27 or the external device connected to the external interface 28 (step 12).

According to the embodiment 1, as hereinabove described, the raw image data is temporarily compressed and stored in the main memory 26 and the compressed data is expanded and read so that the RPU 14 executes real-time image processing, whereby the scale of buffer areas of the main memory 26 can be reduced. Thus, it is possible to minimize the size of the main memory 26 or the like in response to the number of pixels of the CCD 12 and optimize the buffer areas.

Figure 4:
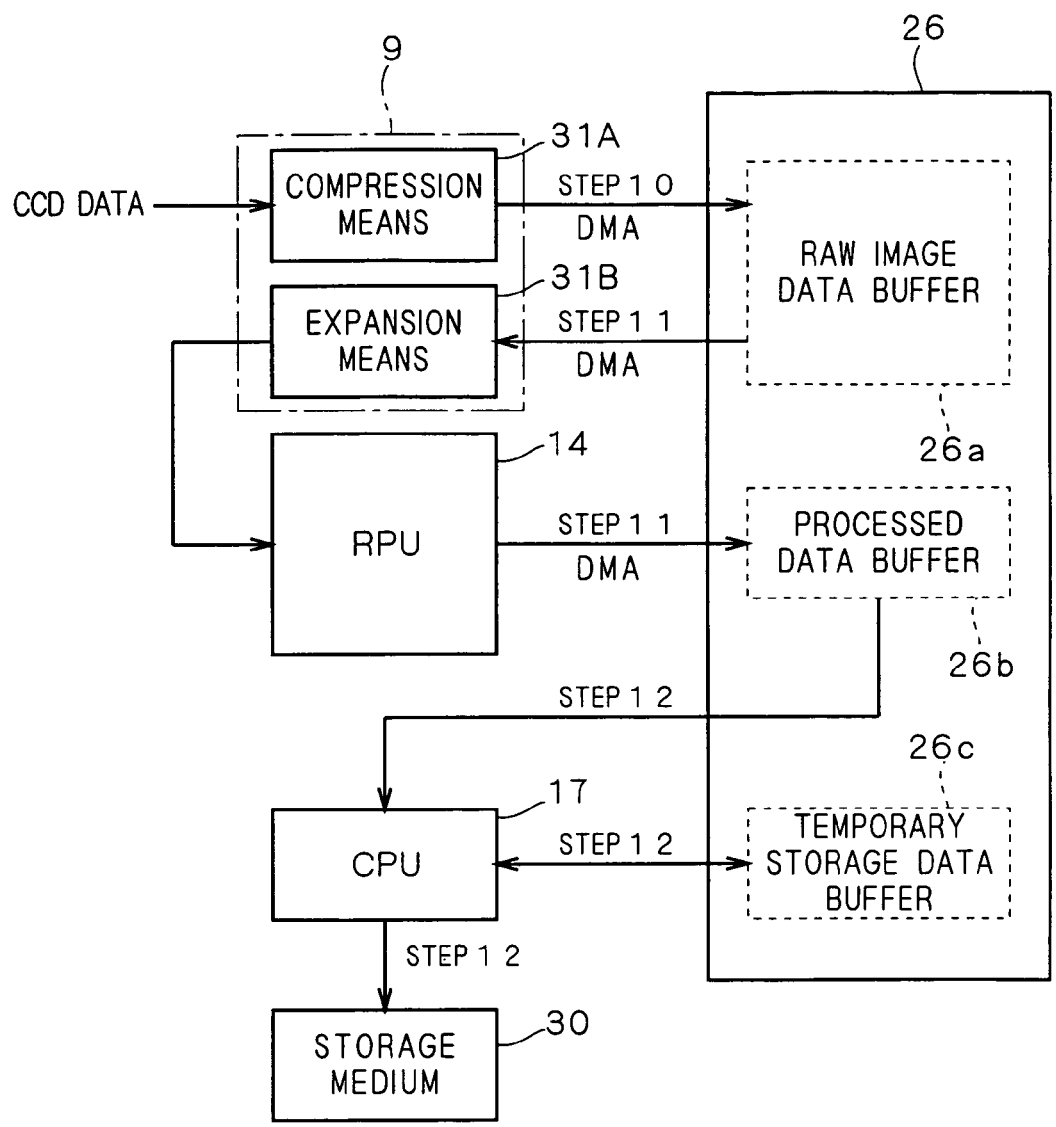
FIG. 4 is a schematic block diagram showing the flow of image signal processing by an image processing circuit according to a modification of the embodiment 1 of the present invention.

As shown in FIG. 4, data transfer between the image compression/expansion circuit 9 comprising the compression means 31A and the expansion means 31B and the main memory 26 as well as between the RPU 14 and the main memory 26 is preferably executed not through the CPU 17 but in the DMA system controlled by the DMA controller 24.

Embodiment 2.

Figure 5:
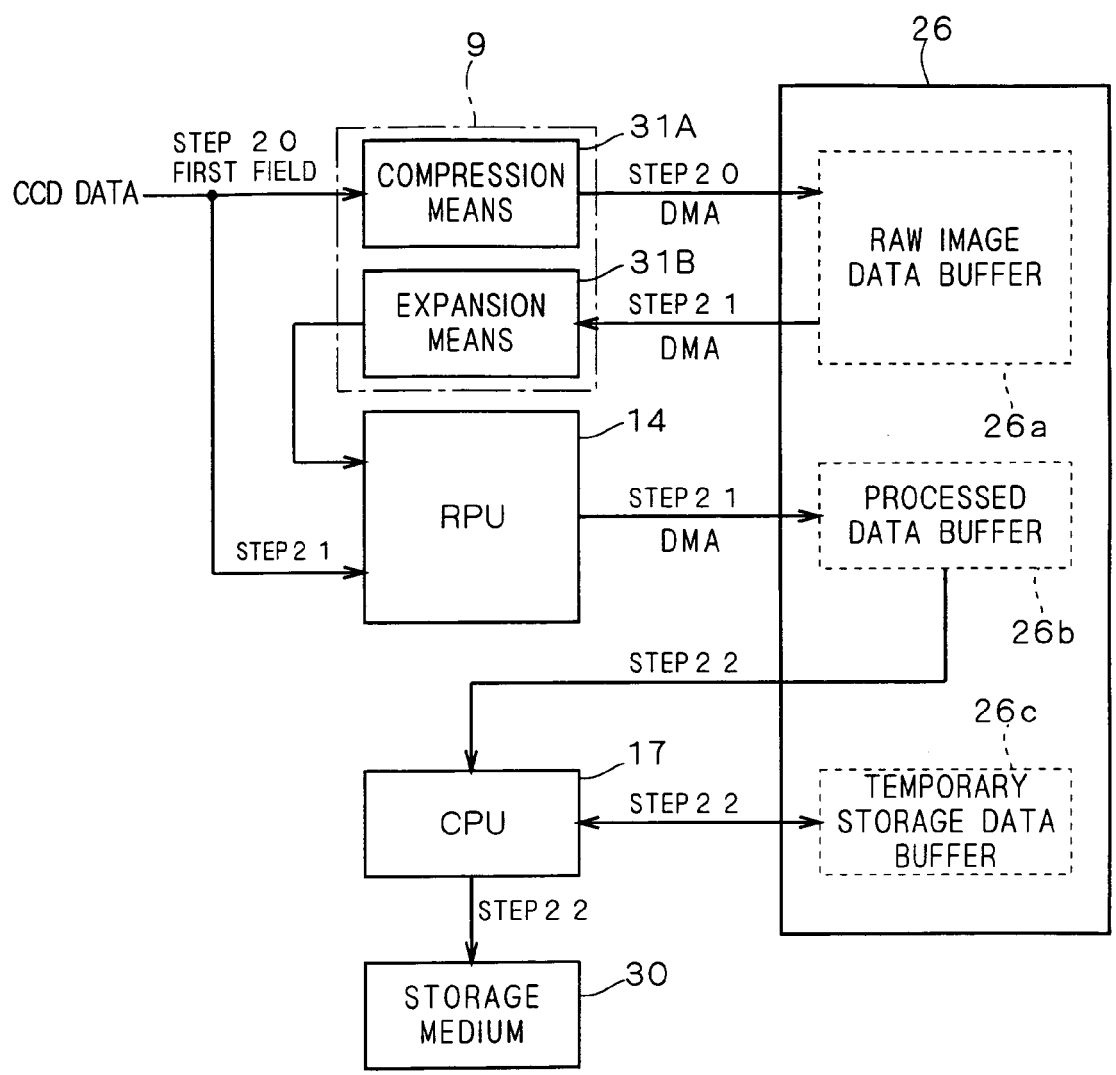
FIG. 5 is a schematic block diagram showing the flow of image signal processing by an image processing circuit according to an embodiment 2 of the present invention.

The image processing circuit according to the aforementioned embodiment 1 is particularly effective for an image pickup device driven by the interlacing system. FIG. 5 is a block diagram showing the flow of image signal processing in an image processing circuit according to an embodiment 2 of the present invention applying the image processing circuit according to the aforementioned embodiment 1 to a CCD 12 of the interlacing system.

As shown in FIG. 5, either one (hereinafter referred to as a first field) of an odd field consisting of only odd lines and an even field consisting of only even lines forming a frame is A/D converted by the aforementioned analog signal processing circuit 13 and thereafter compressed by the compression means 31A of the aforementioned image compression/expansion circuit 9, and the compressed data is directly transferred from the image compression/expansion circuit 9 toward a raw image data buffer 26a provided in a main memory 26 under control of a DMA controller 24 in the DMA system and stored therein (step 20).

After the first field is stored in the raw image data buffer 26a, pixel data of the other field (hereinafter referred to as a second field) is A/D converted in the aforementioned analog signal processing circuit 13 and thereafter sequentially input in an RPU 14 while the compressed data of the first field is transferred toward the expansion means 31B of the image compression/expansion circuit 9 from the raw image data buffer 26a in the DMA system and read. The RPU 14 reads the first field expanded in the expansion means 31B in synchronization with the second field, executes the aforementioned real-time image processing and directly transfers the processed data to a processed data buffer 26b of the main memory 26 in the DMA system for making the processed data buffer 26b store the processed data (step 21).

The image data subjected to the real-time image processing in the RPU 14 and stored in the processed data buffer 26c in the aforementioned manner is read by a CPU 17. The CPU 17 performs software processing such as JPEG compression using a temporary storage data buffer 26c, for storing and preserving the processed data in a storage medium 30 such as the aforementioned memory card 27 or an external device connected to an external interface 28 (step 22).

Thus, the main memory 26 stores the data (for ½ frames) of the first field in a compressed state, whereby the scale of buffer areas of the main memory 26 can be reduced. Further, data transfer between the compression and expansion means 31A and 31B and the main memory 26 is performed in the DMA system and the RPU 14 can perform real-time image processing such as pixel interpolation, color conversion or edge enhancement on the first and second fields during a reading period for the second field, whereby the real-time image processing can be efficiently ended at the moment when reading of the second field is ended. Therefore, a picked-up image can be displayed on a finder such as an LCD 23 substantially without a time delay.

When performing the aforementioned real-time image processing on an image signal picked up by an image pickup device such as the CCD 12, it is necessary to refer to and batch-process pixel data of three to five lines including even and odd lines in pixel interpolation, for example. When performing the aforementioned real-time processing on a CCD of the interlacing system, therefore, line memories for a single field is generally prepared in the RPU 14. However, the ratio of the line memory occupying the overall circuit is too large to suit to miniaturization/size reduction of the device, while the number of processible pixels is reduced and limited if the line memory is limited. According to this embodiment, the data stored in the main memory 26 is directly transferred to the RPU 14 in the DMA system to be subjected to real-time image processing, whereby no line memory for a single field may be prepared in the RPU 14 and the number of processible horizontal pixels is hardly limited by the capacity of the main memory 26.

Embodiment 3.

Figure 6:
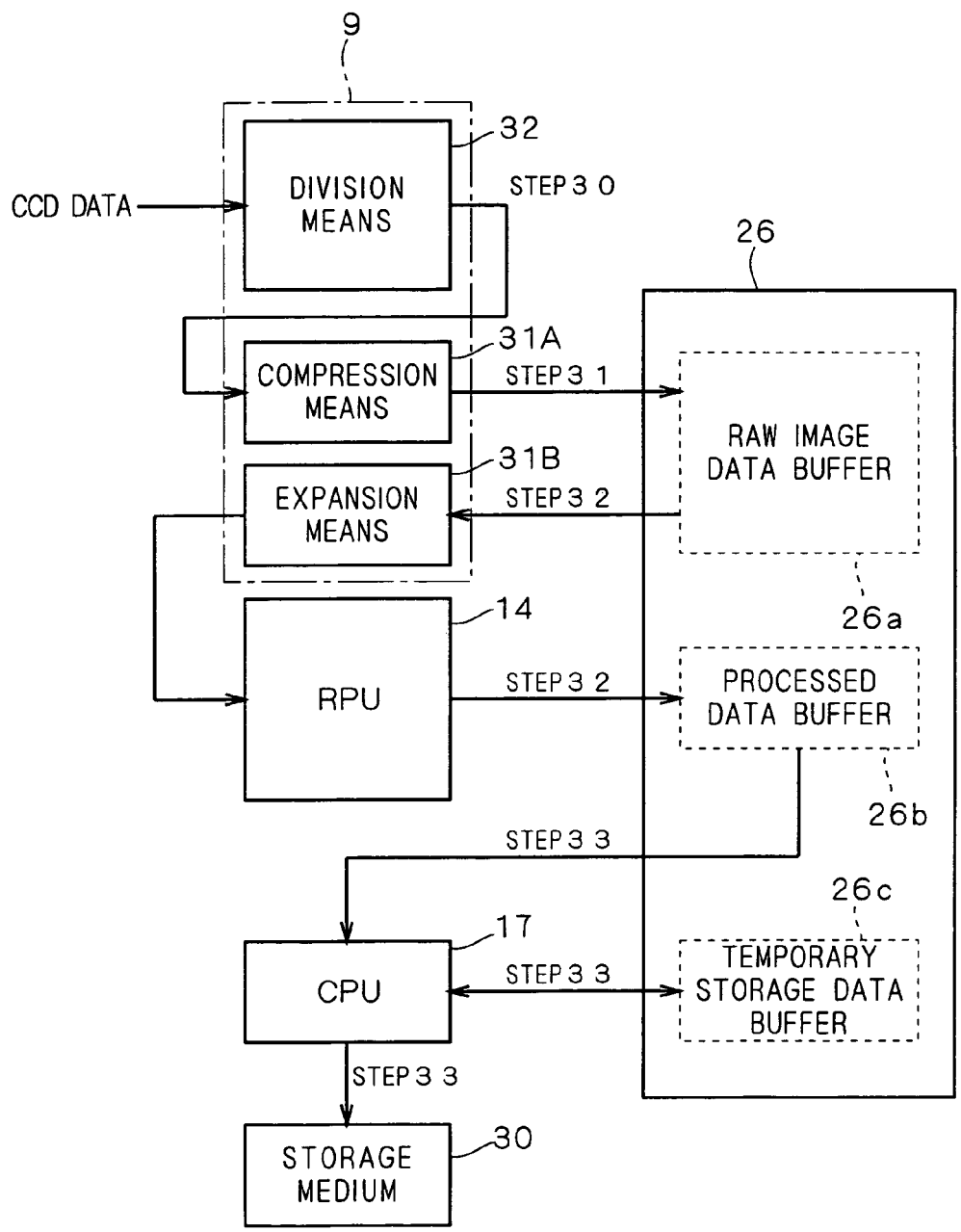
FIG. 6 is a schematic block diagram showing the flow of image signal processing by an image processing circuit according to an embodiment 3 of the present invention.

FIG. 6 is a block diagram showing the flow of image signal processing in an image processing circuit according to an embodiment 3 of the present invention.

As shown in FIG. 6, CCD data is A/D converted by an analog signal processing circuit similar to the aforementioned analog signal processing circuit 13 and thereafter input in division means 32 of an image compression/expansion circuit 9, to be divided into a plurality of blocks in real time (step 30). At this time, a single frame of an input image signal may be divided in units of a plurality of lines or a single line processible in an RPU 14, or may be divided into a plurality of tiles through vertical and horizontal lines.

Compression means similar to the aforementioned compression means 31A compresses such image data by entropy coding or the like in units of blocks, and transfers the compressed data to a raw image data buffer 26a of a main memory 26 to be stored therein (step 31). Alternatively, the image compression/expansion circuit 9 may directly transfer the compressed data to the main memory 26 in the aforementioned DMA system. The compressed data stored in the raw image data buffer 26a is transferred to expansion means similar to the aforementioned expansion means 31B to be expanded in units of blocks, so that pixel data of the expanded data is sequentially output to the RPU 14 and subjected to real-time image processing. The data processed in the RPU 14 is output and transferred to a processed data buffer 26b of the main memory 26, and stored therein in units of frames (step 32).

The CPU 17 reads an image (frame) from the processed data buffer 26b when receiving an instruction and executes software processing such as JPEG compression using a temporary storage data buffer 26c, for storing and preserving the processed data in a storage medium 30 such as a memory card similar to the aforementioned memory card 27 or an external device connected to an external interface 28 (step 33).

Thus, the image processing circuit according to the embodiment 3 performs compression/expansion in units of blocks. If a defect is found in a certain block, therefore, influence of this defect can be suppressed to only this block.

Embodiment 4.

Figure 7:
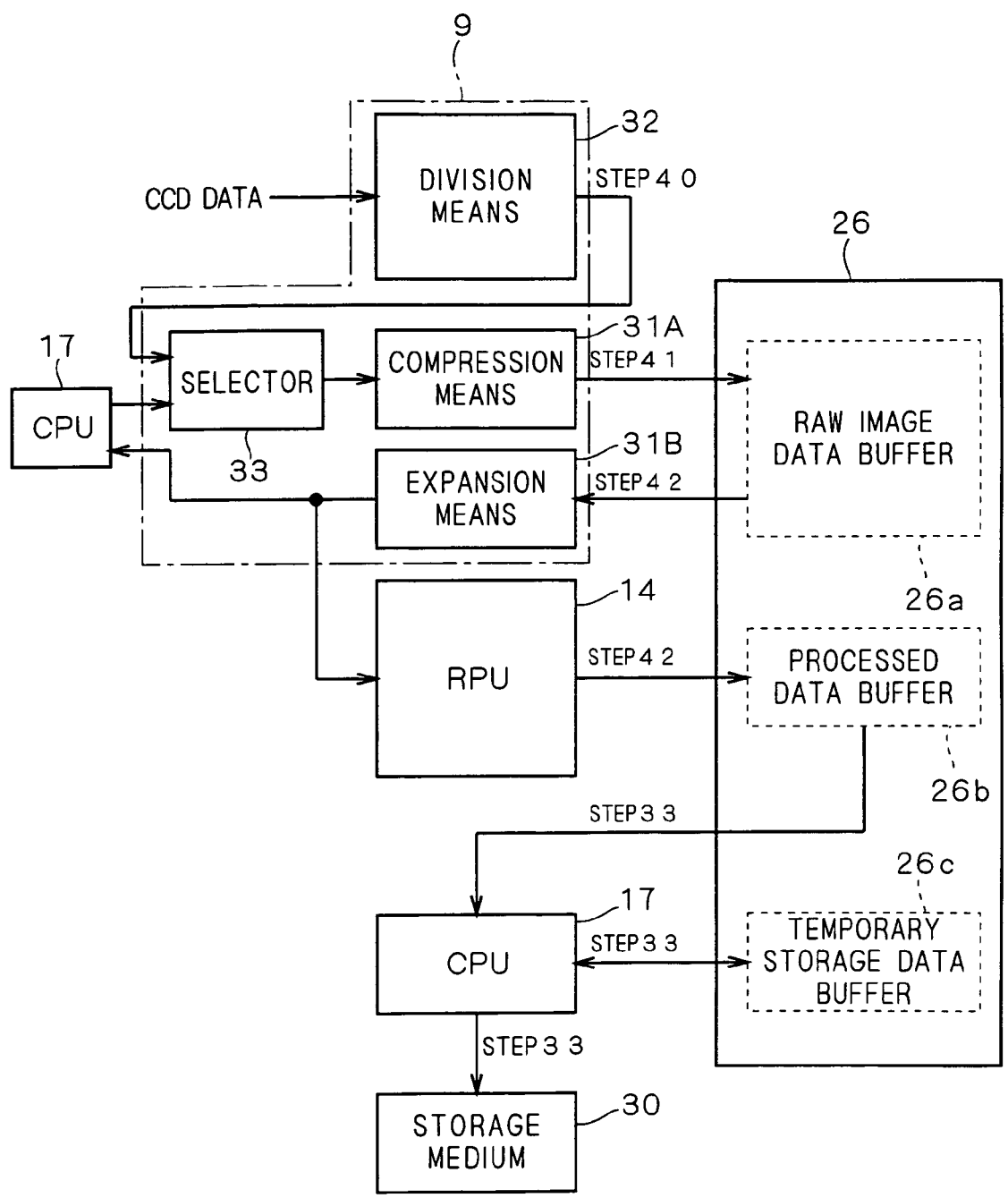
FIG. 7 is a schematic block diagram showing the flow of image signal processing by an image processing circuit according to an embodiment 4 of the present invention.

FIG. 7 is a schematic block diagram showing the flow of image signal processing in an image processing circuit according to an embodiment 4 of the present invention prepared by improving the aforementioned embodiment 3. The feature of this embodiment resides in that the image processing circuit comprises a selector 33 switching the destination of connection of compression means 31A to either division means 32 or a CPU 17 and the CPU 17 executing a defect inspection of a block expanded in expansion mean 31B and defect correction by software processing.

As shown in FIG. 7, A/D converted CCD data is input in the division means 32 of an image compression/expansion circuit 9, and divided into a plurality of blocks having a prescribed bit length in real time (step 40). A divided image signal is input in the aforementioned compression means 31A through the selector 33, compressed in units of blocks by entropy coding or the like, and transferred to and temporarily stored in a raw image data buffer 26a of a main memory 26 (step 41).

Then, the compressed data stored in the raw image data buffer 26a is transferred to and expanded in the expansion means 31B. A defective pixel of an image pickup device such as a CCD 12 is previously recognized through a test in any fabrication step or a subsequent step, and the address of the defective pixel is written in a nonvolatile memory in a digital still camera 1 or the main memory 26. The CPU 17 refers to the nonvolatile memory or the like with a required software program. When reading expanded blocks and detecting a block including defective pixel data, the CPU 17 corrects the defective pixel data of this block. Then, the CPU 17 controls the selector 33 to connect the compression means 31A with the CPU 17, outputs the corrected block to the compression means 31A for transferring and storing the same to and in the raw image data buffer 26a of the main memory 26.

When an image picked up by the CCD 12 includes a defective pixel, the defective pixel data may be replaced with normal pixel data precedently input by one stage as the same color component as the defective pixel, for example. The general CCD 12 has millions of pixels in a single frame, and hence a sufficiently visual image can be obtained by replacing the defective pixel by such a relatively simple method.

When the normal block replacing the defective block is expanded in the expansion means 31B, the expanded pixel data is sequentially output to the RPU 14 to be subjected to real-time image processing and thereafter transferred to a processed data buffer 26b to be stored therein in units of frames (step 42). Subsequent processing is similar to that of the aforementioned step 33 described with reference to the embodiment 2.

According to this embodiment, defective pixel data can be corrected in units of blocks, so that a high-definition image can be displayed on a finder or the like at a high speed and preserved in a storage medium.

Embodiment 5.

Figure 8:
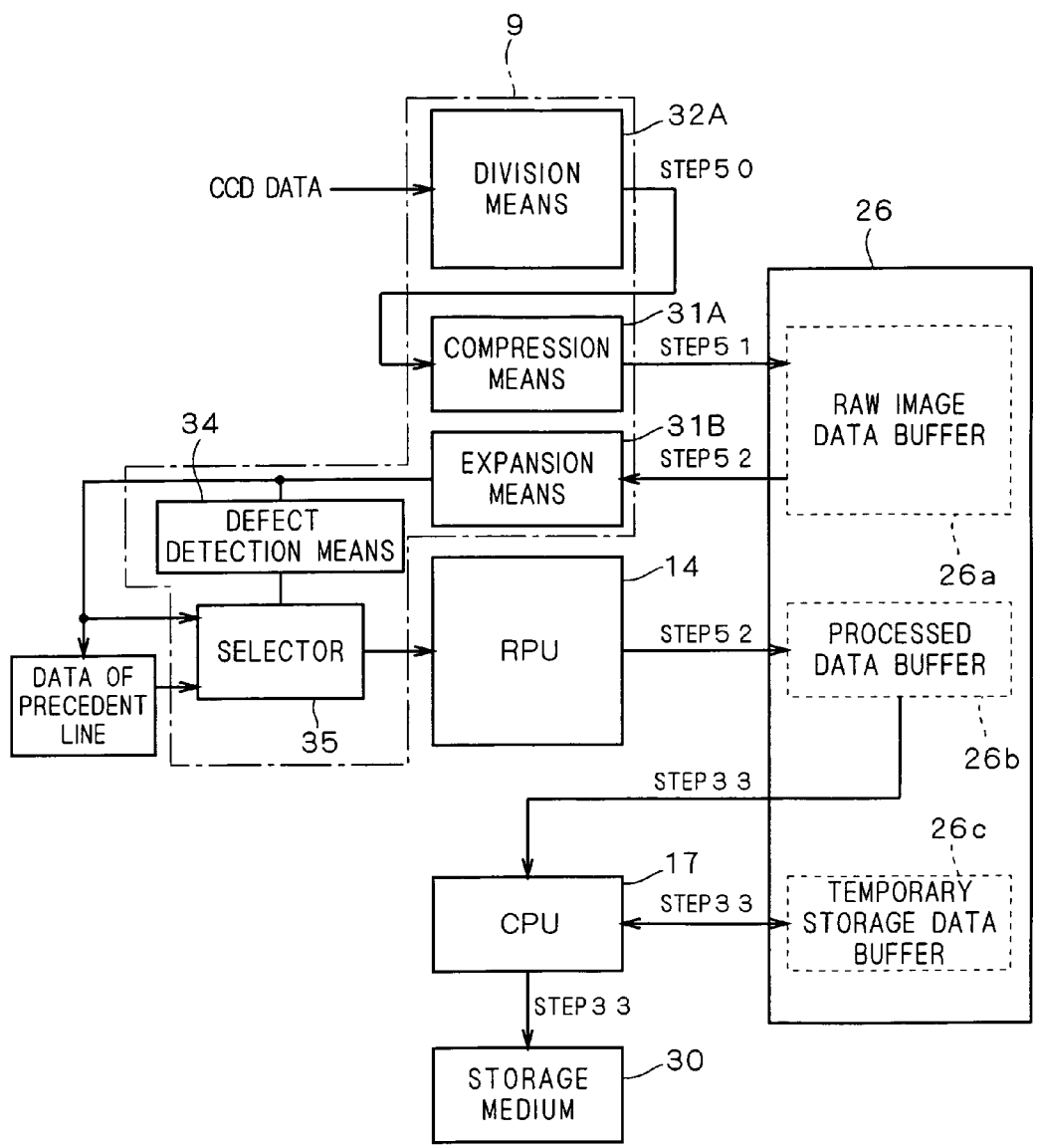
FIG. 8 is a schematic block diagram showing the flow of image signal processing by an image processing circuit according to an embodiment 5 of the present invention.

FIG. 8 is a schematic block diagram showing the flow of image signal processing in an image processing circuit according to an embodiment 5 of the present invention prepared by improving the aforementioned embodiment 3. According to this embodiment, A/D converted CCD data is input in division means 32A of an image compression/expansion circuit 9 and divided every line in real time (step 50). Then, a divided image signal is compressed in compression means 31A every line, and thereafter transferred to and stored in a raw image data buffer 26a of a main memory 26 under control of a CPU 17 or a DMA controller 24 (step 51).

Then, the compressed data stored in the raw image data buffer 26a is transferred to expansion means 31B to be expanded every line, and the expanded data is subjected to defect detection in units of lines in defect detection means 34 of an image compression/expansion circuit 9. When the defect detection means 34 detects no defect caused in compression/expansion on any line, the expanded data is transferred from the expansion means 31B to an RPU 14 since a selector 35 connects the expansion means 31B with the RPU 14. When the defect detection means 34 detects a defect on any line, the selector 35 is controlled to switch the connection to between the RPU 14 and a line memory storing data of a line precedent to the current line or the like, for making the RPU 14 output the data of the precedent line in place of the current line (step 52). Thus, defective pixel data can be detected and corrected in units of lines, so that a high-definition image can be displayed on a finder or the like at a high speed and preserved in a storage medium.

While the image processing circuit according to the embodiment 5 divides the aforementioned CCD data in units of lines and performs defect detection in units of lines, the CCD data may alternatively be divided into blocks so that defect detection is performed in units of blocks.

Embodiment 6.

Figure 9A:
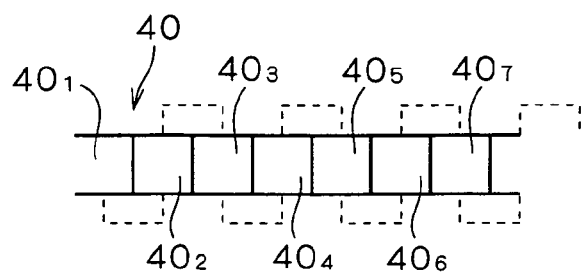
FIG. 9A is an explanatory diagram showing a differential compression method according to an embodiment 6 of the present invention.
Figure 9B:
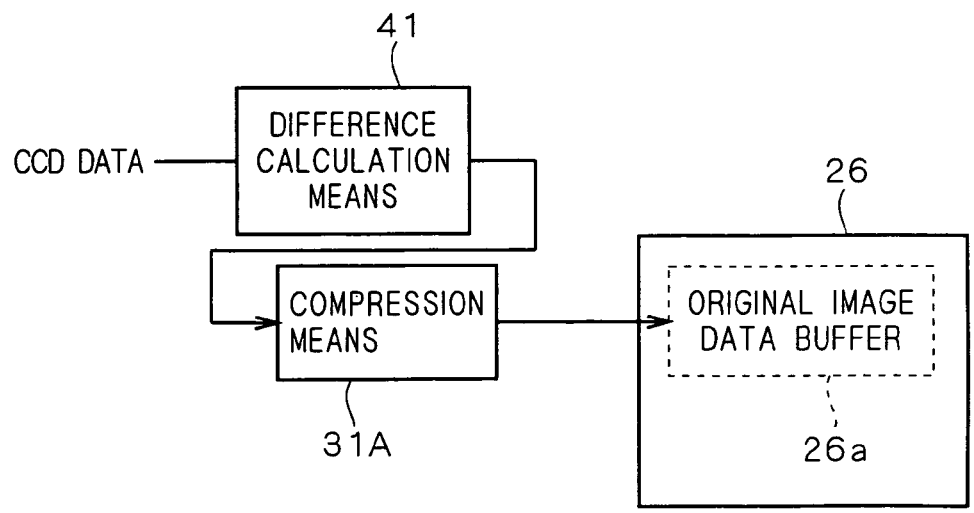
FIG. 9B is a schematic block diagram showing an exemplary structure implementing the differential compression.

Before compressing the A/D converted CCD data in the aforementioned compression means 31A in each of the aforementioned embodiments 1 to 5, the difference between the values of pixel data is preferably calculated for compressing the data. FIG. 9A is a schematic diagram for illustrating differential compression according to an embodiment 6 of the present invention, and FIG. 9B is a schematic block diagram showing an exemplary structure implementing the differential compression. As shown in FIG. 9B, CCD data A/D converted in the aforementioned analog signal processing circuit 13 is input in difference calculation means 41, which in turn calculates the difference between the values of pixels adjacent to each other along the time base in each line forming a frame for converting the CCD data to differential data. As shown in FIG. 9A, the difference calculation means 41 calculates the differences between pixel values of the same color components between pairs of pixels $40_1$ and $40_2$, $40_2$ and $40_3$, $40_3$ and $40_4$, . . . in pixels $40_1$, $40_2$, $40_3$, . . . forming CCD data 40 of a single line for generating differential data. Then, compression means 31A performs reversible coding such as entropy coding on such differential data, so that compressed data thereof is transferred to and stored in a raw image data buffer 26a of a main memory 26.

Embodiment 7.

Figure 10A:
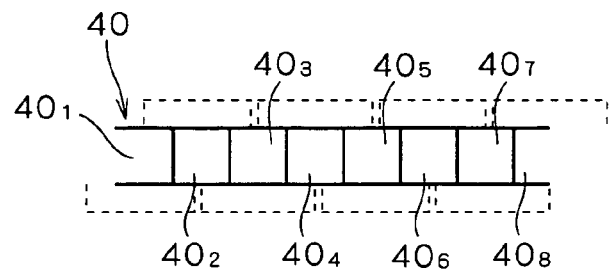
FIG. 10A is an explanatory diagram showing a differential compression method according to an embodiment 7 of the present invention.
Figure 10B:
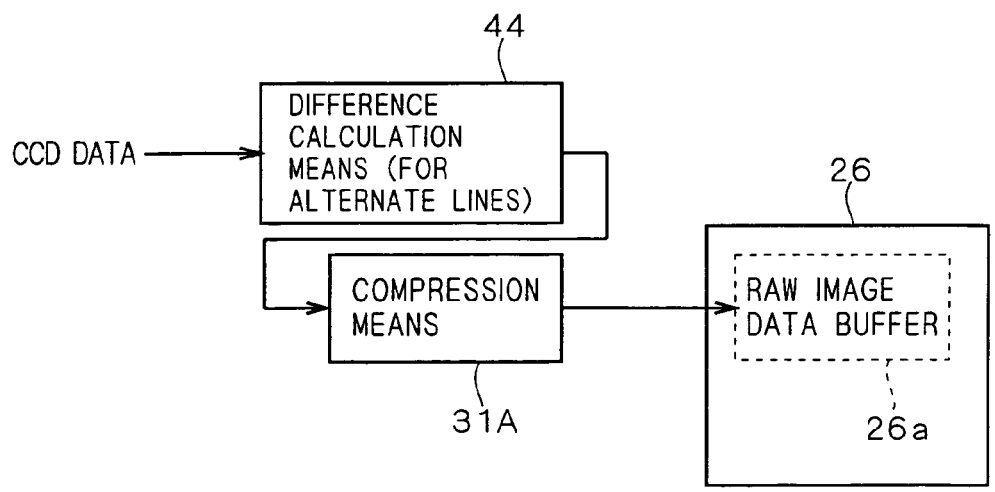
FIG. 10B is a schematic block diagram showing an exemplary structure implementing the differential compression.

FIGS. 10A and 10B show another exemplary differential compression according to an embodiment 7 of the present invention. FIG. 10A is a schematic diagram for illustrating the differential compression according to the embodiment 7, and FIG. 10B is a schematic block diagram showing an exemplary structure implementing the differential compression. As shown in FIG. 10B, A/D converted CCD data is input in difference calculation means 44, which in turn calculates the difference between the values of alternate pixels along the time base in each line forming a frame for converting the CCD data to differential data. As shown in FIG. 10A, the difference calculation means 44 calculates the differences between pixel values of the same color components between alternate pixels $40_1$ and $40_3$, $40_2$ and $40_4$, $40_3$ and $40_5$, . . . in pixels $40_1$, $40_2$, $40_3$, . . . forming CCD data of a single line for generating differential data. Then, compression means 31A performs reversible coding such as entropy coding on such differential data, so that compressed data thereof is transferred to and stored in a raw image data buffer 26a of a main memory 26.

Embodiment 8.

Figure 11A:
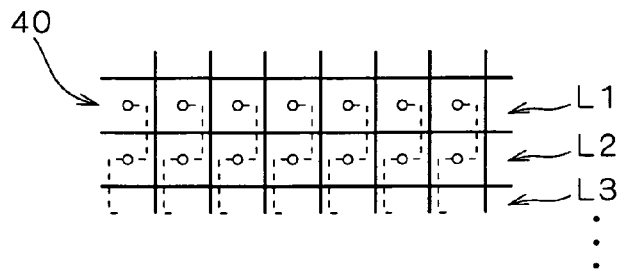
FIG. 11A is an explanatory diagram showing a differential compression method according to an embodiment 8 of the present invention.
Figure 11B:
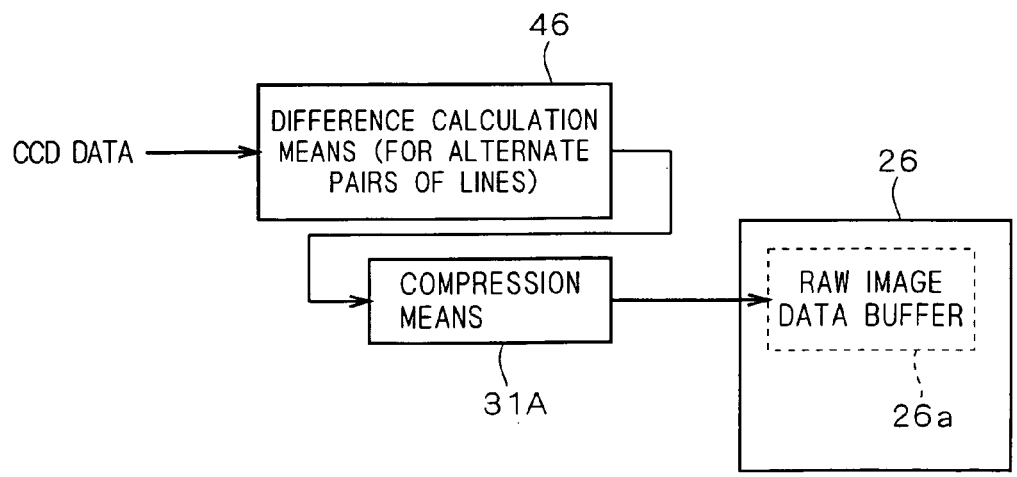
FIG. 11B is a schematic block diagram showing an exemplary structure implementing the differential compression.

FIGS. 11A and 11B show still another exemplary differential compression according to an embodiment 8 of the present invention. FIG. 11A is a schematic diagram for illustrating the differential compression according to the embodiment 8, and FIG. 11B is a schematic block diagram showing an exemplary structure implementing the differential compression. As shown in FIG. 11A, difference calculation means 46 calculates the difference Δ between pixel values of the same color component as to vertically adjacent two pixels mapped by dotted lines between adjacent two lines L1 and L2 and similarly calculates differences as to pairs of pixels between two lines L2 and L3, two lines L3 and L4, . . . thereby converting CCD data 40 to differential data. As shown in FIG. 11B, the difference calculation means 46 generates the differential data and compression means 31A compresses the differential data, which in turn is transferred to a main memory 26 and stored in a raw image data buffer 26a.

Embodiment 9.

Figure 12A:
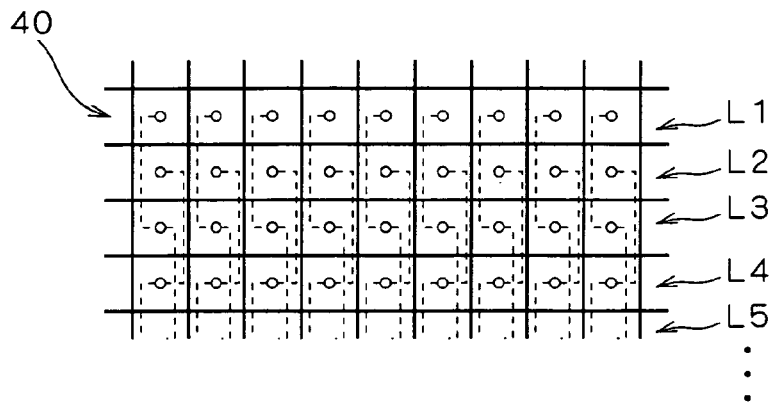
FIG. 12A is an explanatory diagram showing a differential compression method according to an embodiment 9 of the present invention.
Figure 12B:
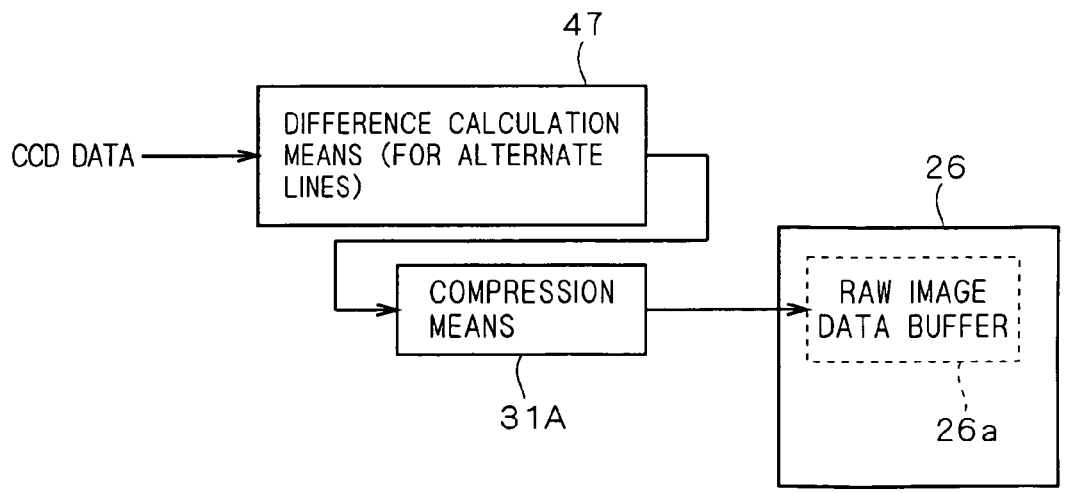
FIG. 12B is a schematic block diagram showing an exemplary structure implementing the differential compression.

FIGS. 12A and 12B show further exemplary differential compression according to an embodiment 9 of the present invention. FIG. 12A is a schematic diagram for illustrating the differential compression according to the embodiment 9, and FIG. 12B is a schematic block diagram showing an exemplary structure implementing the differential compression. As shown in FIG. 12A, difference calculation means 47 calculates the differences between pixel values of the same color components as to vertically adjacent pairs of pixels shown by dotted lines between alternate pairs of lines L1 and L3, L2 and L4, L3 and L5, . . . thereby converting CCD data 40 to differential data. As shown in FIG. 12B, the difference calculation means 47 generates the differential data and compression means 31A compresses the differential data, which in turn is transferred to a main memory 26 and stored in a raw image data buffer 26a.

Either the difference calculation means 46 according to the aforementioned embodiment 8 or the difference calculation means 47 according to the aforementioned embodiment 9 is preferably selected in response to the arrangement of a color filter array on CCD pixels and a driving system. The color filter array may be arranged in various ways, such that horizontal lines (odd lines) arranging color filters in order of R (red), G (green), R, G, . . . and horizontal lines (even lines) arranging color filters in order of G (green), B (blue), G, B, . . . are alternately arranged in the vertical direction in the basic form of a Bayer system color filter array, for example. In this case, pixels of the same color component appear on alternate lines, and differential compression of pixel values of the same color component is enabled by selecting the difference calculation means 47 according to the aforementioned embodiment 9 when the CCD 12 is driven by the aforementioned progressive system. When the CCD 12 having such a color filter array is driven by the aforementioned interlacing system, on the other hand, differential compression of pixels of the same color component is enabled by selecting the difference calculation means 46 according to the aforementioned embodiment 8 with respect to odd and even fields read as the CCD data respectively.

While the compressed data stored in the raw image data buffer 26a is expanded in the expansion means 31B and thereafter output to the RPU 14 in each of the aforementioned embodiments 6 to 9, processing of decoding the expanded data (differential compression signal) expanded in the expanded means 31B to original data not yet subjected to differential compression is executed before executing the aforementioned real-time image processing in the RPU 14.

While the invention has been shown and described in detail, the foregoing description is in all aspects illustrative and not restrictive. It is therefore understood that numerous modifications and variations can be devised without departing from the scope of the invention.

What is claimed is:

1. An image processing circuit processing raw image data picked up with an image pickup device, comprising:
    means for A/D converting said raw image data, wherein said raw image data is image data to which no pixel interpolation has been performed;
    means for compressing the raw image data converted by and transferred from said A/D converting means;
    means for temporarily storing compressed data transferred from said compression means;
    means for reading said compressed data from said means for temporarily storing compressed data and expanding the same; and
    means for executing image processing on expanded data transferred from said expansion means.

2. The image processing circuit according to claim 1, wherein said image pickup device is driven by an interlacing system reading an odd field consisting of only odd lines and an even field consisting of only even lines forming a frame at temporally different timings,
    said means for temporarily storing compressed data stores said compressed data of a first field formed by either said odd field or said even field, and
    said means for executing image processing reads said first field stored in said means for temporarily storing compressed data in synchronization with entry of a second field formed by remaining said field and executes real-time image processing on said first and second fields.

3. The image processing circuit according to claim 1 or 2, wherein
    data transfer between said compression means and said means for temporarily storing compressed data, and data transfer between said means for expanding and said means for temporarily storing compressed data are controlled by a direct memory access system.

4. The image processing circuit according to claim 1, further comprising:
    means for dividing said raw image data into a plurality of blocks and outputting the same to said means for compressing, wherein
    said means for compressing and said means for expanding execute compression and expansion in units of said blocks.

5. The image processing circuit according to claim 4, further comprising:
    means for detecting a block including previously specified defective pixel data among said expanded data expanded by said means for expanding and outputting a block obtained by correcting said defective pixel data to said means for compressing.

6. The image processing circuit according to claim 4, further comprising:
    means for performing a defect inspection before outputting said expanded data expanded by said means for expanding to said means for executing image processing for replacing a block having detected defective pixel data with a normal block and outputting the same to said means for compressing.

7. The image processing circuit according to any of claims 4 to 6, wherein
    said means for dividing divides said raw image data into a plurality of blocks in units of lines.

8. The image processing circuit according to claim 1 or 2, further comprising:
    means for calculating the difference between pixel values of said raw image data and outputting said difference to said means for compressing before compressing said raw image data in said compression means.

9. The image processing circuit according to claim 8, wherein
    said means for calculating calculates the difference between the values of pixels adjacent to each other along a time base.

10. The image processing circuit according to claim 8, wherein
    said means for calculating calculates the difference between the values of alternate pixels along a time base.

11. The image processing circuit according to claim 8, wherein
    said means for calculating calculates the difference between the values of vertically adjacent two pixels of two lines of said raw image data.

12. The image processing circuit according to claim 8, wherein
    said means for calculating calculates the difference between the values of vertically adjacent two pixels of alternate lines of said raw image data.

13. The image processing circuit according to claim 8, wherein
    said means for calculating, which calculates the difference between the values of vertically adjacent two pixels of alternate lines or two lines of said raw image data, is selected in response to a driving system for said image pickup device.

14. A method for processing raw image data picked up with an image pickup device, comprising the steps of:
    A/D converting said raw image data, wherein said raw image data is image data to which no pixel interpolation has been performed;
    compressing the raw image data converted in said A/D converting step;
    temporarily storing compressed data compressed in said compression step;
    reading said compressed data from storage;
    expanding said compressed data read from storage; and
    executing image processing on expanded data expanded in said expanding step.

15. An image processing apparatus for processing raw image data picked up with an image pickup device, comprising:
    an A/D converter configured to A/D convert said raw image data, wherein said raw image data is image data to which no pixel interpolation has been performed;
    a compressor configured to compress the raw image data converted by and transferred from said A/D converter;
    a buffer configured to temporarily store compressed data transferred from said compressor;
    an expander configured to read said compressed data from said buffer and expanding the same; and
    an image processor configured to execute image processing on expanded data transferred from said expander.

* * * * *